(12) United States Patent
Kim

(10) Patent No.: US 6,625,086 B1
(45) Date of Patent: Sep. 23, 2003

(54) TERRESTRIAL GLOBE WITH WORLD-WIDE WATCH FUNCTION

(75) Inventor: Jung Soo Kim, Inchon-shi (KR)

(73) Assignee: Hanbit System Co., Ltd., Kyunggi-do (KR)

( * ) Notice: Subject to any disclaimer, the term of this patent is extended or adjusted under 35 U.S.C. 154(b) by 0 days.

(21) Appl. No.: 09/269,971

(22) PCT Filed: Dec. 30, 1998

(86) PCT No.: PCT/KR98/00486

§ 371 (c)(1), (2), (4) Date: Apr. 8, 1999

(87) PCT Pub. No.: WO99/36837

PCT Pub. Date: Jul. 22, 1999

(30) Foreign Application Priority Data

Jan. 14, 1998 (KR) .......................................... 98-335 U

(51) Int. Cl.[7] .............................................. G04B 19/22
(52) U.S. Cl. ........................................... 368/21; 368/23
(58) Field of Search .................. 368/21–23, 24

(56) References Cited

U.S. PATENT DOCUMENTS

| | | | |
|---|---|---|---|
| 4,477,193 A | 10/1984 | Yasufuku | |
| 4,985,876 A | * 1/1991 | Vazquez | 368/23 |
| 5,007,033 A | * 4/1991 | Kubota et al. | 368/21 |
| 5,132,943 A | 7/1992 | Davies | |
| 6,108,277 A | * 8/2000 | Whitmore | 368/15 |

FOREIGN PATENT DOCUMENTS

| | | |
|---|---|---|
| JP | 56-96284 | 8/1981 |
| TW | 71501 | 10/1985 |

* cited by examiner

*Primary Examiner*—Vit Miska
(74) *Attorney, Agent, or Firm*—Birch, Stewart, Kolasch & Birch, LLP

(57) ABSTRACT

A terrestrial globe with a world-wide watch function according to a rotation of the globe. In the globe, a sensor is installed at one end of a rotation axis to detect a rotation amount of the globe. A world-wide time display processes an input information from the sensor using the sensor to display major city (or country) names and a current time and date (i.e., year, month, day, day of the week) in a time zone of the earth corresponding to the rotation amount of the globe. The globe according to the present invention is capable of easily selecting a time zone only with an operation rotating the globe as well as conveniently displaying city (or country) names and a current time and date (i.e., year, month, day, week, etc.) in the selected time zone.

6 Claims, 2 Drawing Sheets

TERRESTRIAL GLOBE WITH WORLD-WIDE WATCH FUNCTION

This application is the national phase under 35 U.S.C. §371 of PCT International Application No. PCT/KP98/00486 which has an International filing date of Dec. 30, 1998 which designated the United States of America.

TECHNICAL FIELD

This invention relates to a terrestrial globe, and more particularly to a terrestrial globe with a world-wide watch function wherein current times in major cities are displayed depending on a rotation of the globe.

BACKGROUND ART

Nowadays, due to an increase in a trade amount between foreign countries and cities, a frequent business trip, a fast increase in overseas trip population and emigrants, there has been steadily increased a desire for easily knowing a time in foreign countries or other cities, hereinafter referred to as "world-wide time". Examples of the conventional method for knowing the world-wide time includes using an additional watch for indicating a current time in a desired time zone and using a computer or an electric watch capable of displaying the worldwide time. Another example is to calculate a current time in a desired territory of the earth with the aid of the world-wide time difference table.

A terrestrial globe has been utilized as the best convenient means for indicating each country or territory of the earth besides a world map. The terrestrial globe also is usually used for an education and a decoration. However, the existing terrestrial globe fails to meet the above-mentioned desire for the knowledge of the world-wide time for each territory of the earth because it has only a function of confirming a position of each country or territory by rotating the globe.

DISCLOSURE OF INVENTION

Accordingly, it, is an object of the present invention to provide a novel terrestrial globe with a world-wide watch function.

Another object of the present invention is to provide a terrestrial globe incorporating a world-wide watch that is capable of a current time in a country or territory pointed out by a time zone indicating bar of the globe.

Still another object of the present invention is to provide a terrestrial globe incorporating a world-wide watch that is capable of a city (or country) name and a current time and date (i.e., year, month, day, day of the week, etc.) in the corresponding time zone indicated by a time zone indicating bar of the globe.

Still another object of the present invention is to provide a novel terrestrial globe that is capable of easily and conveniently confirming a world-wide time by a simple method of rotating the globe.

In order to achieve these and other objects of the invention, a terrestrial globe with a world-wide watch function according to one aspect of the present invention includes a spherical body having a world map depicted on its surface; a rotation axis passing through the center of the spherical body; a supporting member for supporting the spherical body and the rotation axis; sensing means, installed at one end of the rotation axis, for detecting a rotation amount of the globe; and world-wide time displaying means for processing an input information from the sensing means using a processor included in itself to display a major city name and a current time in a time zone corresponding to the rotation amount of the globe.

A terrestrial globe with a world-wide watch function according to another aspect of the present invention includes a spherical body having a world map depicted on its surface; a rotation axis passing through the center of the spherical body; a supporting member for supporting the spherical body and the rotaition axis; sensing means, installed at one end of the rotation axis, for detecting a rotation amount of the globe and world-wide time displaying means for processing an input information from the sensing means using a processor included in itself to display a major city name and a current time and date (i.e., year, month, day, and day of the week) in a time zone corresponding to the rotation amount of the globe.

BRIEF DESCRIPTION OF DRAWINGS

These and other objects of the invention will be apparent from the following detailed description of the embodiments of the present invention with reference to the accompanying drawings, in which.

BEST MODE FOR CARRYING OUT THE INVENTION

Figure 1:
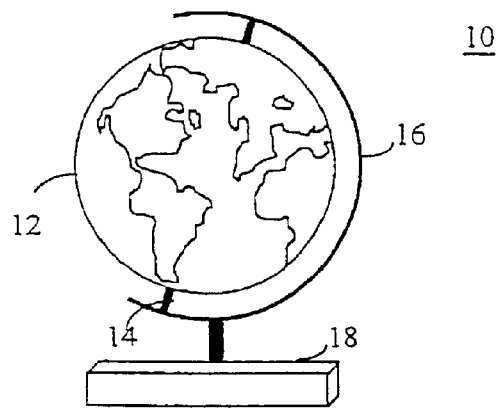
FIG. 1 is a schematic view showing a conventional terrestrial globe.
Figure 2:
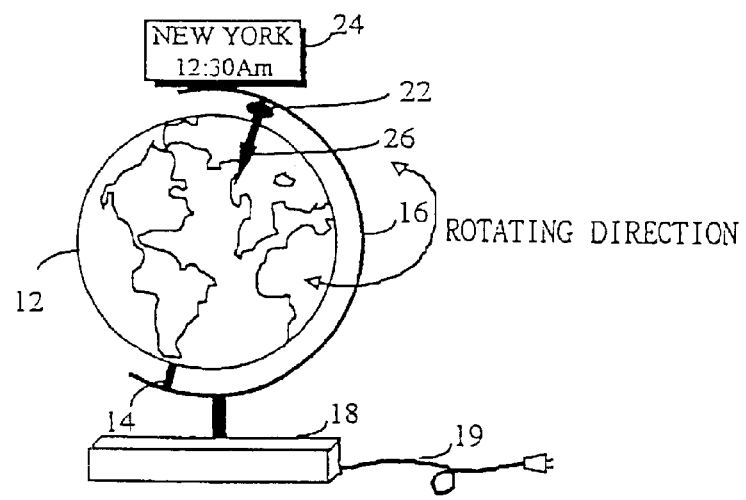
FIG. 2 is a schematic view showing a terrestrial globe with a world-wide watch function according to an embodiment of the present invention.

Referring to FIG. 2, there is shown a terrestrial globe with a world-wide watch function according to an embodiment of the present invention. The terrestrial globe 20 has a basic structure in similarity to the conventional terrestrial globe 10 shown in FIG. 1. The terrestrial globe 20 includes a body 12 having a spherical shape in conformity to a shape of the earth, the surface of which a world map representing each territory of the earth is depicted on, an axis 14 passing through the center of the spherical body 12, and a half-circular supporting beam 16 secured to each end of the axis 14 to support the axis 14. In the terrestrial globe 20 having such a basic configuration, the spherical body 12 is rotated around the center of the axis 14 so that a user can see a desired position at the world map depicted on the globe. The terrestrial globe 20 is provided with a supporting base 18 secured to the supporting beam 16 to stand up the globe.

The terrestrial globe 20 further includes a sensor 22 for detecting its rotation and a world-wide time display 24 for displaying a current time for each territory in the earth. More specifically, the sensor 22 is installed at one end of the axis 14 to sense the rotation of the globe 20. The world-wide time display 24 is mounted on the top end of the circular supporting beam 16 to display a major city name and a current time at a corresponding time zone as described later. Moreover, the terrestrial globe 20 includes a time zone indicating bar 26 for permitting a user to confirm a desired territory. The time zone indicating bar 26 is fixed to the upper edge of the body 12, in parallel with the axis 14, in such a manner to keep the same position independently of a rotation of the body 12. Accordingly, a time displayed on the world-wide time display 24 can always be a current time in a time zone for each longitude range of the earth to be pointed out by the time zone indicating bar 26.

Figure 3:
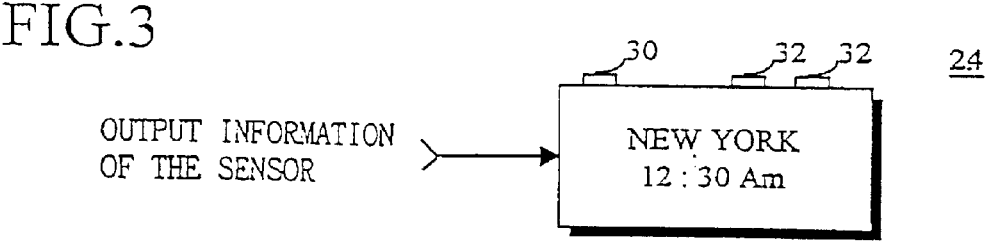
FIG. 3 is a detailed view of the world-wide time display in the terrestrial globe shown in FIG. 2.

The sensor 22 is provided with a rotation axis sensor that is capable of dividing and recognizing once rotation of the globe 20 into the number of time zones in the earth. Thus, when a user rotates the globe, that is, the spherical body 12, the sensor 22 transfers a rotated amount of the globe to the world-wide time display 24 over an electrical line (e.g., a line installed within the axis 14 and the circular supporting beam 16) not shown. The world-wide time display includes a processor for processing an information according to a rotation of globe. The processor consists of a conventional integrated circuit (IC) and has a data for the major city names and the time difference in each time zone so as to output a current time in the corresponding territory. The processor is responsible for calculating a current time according to the time difference data and a major city (or country) name in the corresponding time zone with the aid of an information inputted from the rotation axis sensor included in the sensor 22 due to the rotation of globe when a user rotates the globe, that is, the spherical body 12 and outputting the same to the world-wide time display 24. As shown in FIG. 3, the world-wide time display 24 displays a current time, along with a major city (or country) name, in the corresponding time zone on the display device (e.g., a liquid crystal display (LCD)) in accordance with the transferred data by means of the processor included in itself.

FIG. 3 is a detailed view of the world-wide time display 24 in a terrestrial globe 20 according to an embodiment of the present invention shown in FIG. 2. Referring now to FIG. 3, the world-wide time display 24 includes a reset button 30 and hour/minute set buttons 32. The reset button 30 prevents an output of the world-wide time display 24 from being changed in accordance with the rotation of globe when a user rotates the globe while pushing it. In other words, the reset button 30 serves to initialize the world-wide time display 24. A user can coincide the time zone of the globe with a city name and a time being currently outputted at the world-wide time display 24 using the reset button 30. The hour/minute set buttons 32 are used to re-input an accurate hour or minute in the currently selected time zone. Meanwhile, in the terrestrial globe 20, a power supply 19 is installed at the interior or exterior of the supporting base 18 to apply a power for an operation of the world-wide time display 24 to the globe 20. A line of the power supply 19 is provided within the circular supporting beam 16 to connect the power supply 19 to the world-wide time display 24. The power supply line may be installed in an alternative manner.

In operation, when a user positions the time zone indicating bar at a desired territory of the earth by rotating the spherical body 12 of the terrestrial globe 20 with a view to knowing a position and a current time in the desired territory of the earth, the sensor 22 accurately recognizes a rotation amount of the globe and transfers the same to the processor within the world-wide display 24. Subsequently, a the processor calculates a major city (or country) name and a current time in the corresponding time zone on a basis of the transferred input information, thereby displaying the same on the display device.

Figure 4:
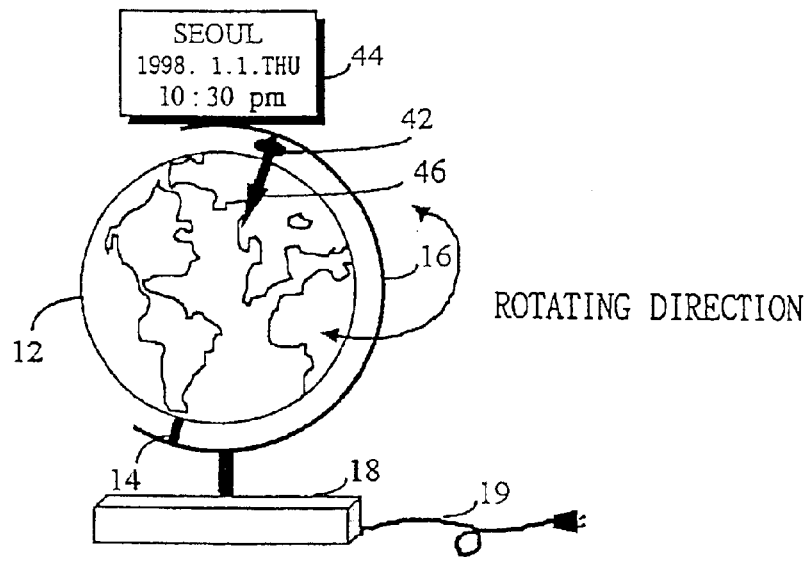
FIG. 4 is a schematic view showing a terrestrial globe with a world-wide watch function according to another embodiment of the present invention.

FIG. 4 is a schematic view showing the configuration of a territorial globe with a world-wide watch function according to another embodiment of the present invention. Since the constructing elements of the terrestrial globe 40 have the same structure and function, except for a world-wide time display 44, compared with the terrestrial globe 20 shown in FIG. 2, a detailed explanation to them will be omitted.

Referring to FIG. 4, the terrestrial globe 40 includes a sensor 42 and a world-wide time display 44. The sensor 22 is installed at one end of the axis 14 to sense the rotation of the globe 40. The world-wide time display 44 is mounted on the top end of a circular supporting beam 16 to display a major city name and a current time and date (e.g., year; month, day, and week, etc.) at a corresponding time zone. The terrestrial globe 20 further includes a time zone indicating bar 46 for permitting a user to confirm a desired territory. The time zone indicating bar 46 is fixed to the upper edge of a spherical body 12, in parallel with an axis 14, in such a manner to keep the same position independently of a rotation of the body 12. Accordingly, a time outputted onto the world-wide time display 24 can always be a current time in a time zone for each longitude range of the earth to be pointed out by the time zone indicating bar 26.

Figure 5:
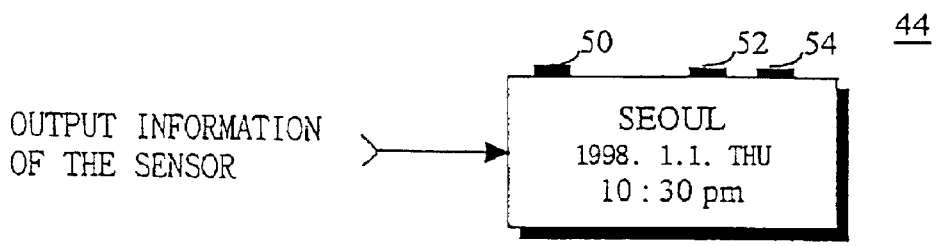
FIG. 5 is a detailed view of the world-wide time display in the terrestrial globe shown in FIG. 4.

The sensor 42 is provided with a rotation axis sensor that is capable of dividing and recognizing once rotation of the globe 20 into the number of time zones in the earth. Thus, when a user rotates the globe, that is, the spherical body 12, the sensor 42 transfers a rotated amount of the globe to the world-wide time display 44 over an electrical line (e.g., a line installed within the axis 14 and the circular supporting beam 16) not shown. The world-wide time display 44 includes a processor for processing an information according to a rotation of globe. The processor consists of a conventional integrated circuit (IC) and has a data for the major city names and the time difference in each time zone so as to output a current time in the corresponding territory. The processor is responsible for calculating a current time and date (e.g., year, month, day, and week, etc.) according to the time difference data and a major city (or country) name in the corresponding time zone with the aid of an information inputted from the rotation axis sensor included in the sensor 42 due to the rotation of globe when a user rotates the globe, that is, the spherical body 12 and outputting the same to the world-wide time display 44. As shown in FIG. 5, the world-wide time display 44 displays a current time and date (e.g., year, month, day and week, etc.), along with a major city (or country) name, in the corresponding time zone on the display device consisting of a liquid crystal display (LCD) in accordance with the transferred data by means of the processor included in itself.

FIG. 5 is a detailed view of the world-wide time display 44 in a terrestrial globe 40 according to another embodiment of the present invention shown in FIG. 4. Referring now to FIG. 5, the world-wide time display 44 includes a reset/up button 50, a city/down button 52, and a set button 54. The reset/up button 50 prevents an output of the world-wide time display 44 from being changed in accordance with the rotation of globe when a user rotates the globe while pushing it. In other words, the reset/up button 50 serves to initialize the world-wide time display 44. A user can coincide the time zone of the globe with a city name and a time being currently outputted at the world-wide time display 44 using the reset/up button 50. In a state of selecting year, month, day, week, hour, minute, etc. using the reset/up button 50, the button 50 acts as an up button to increase the above-mentioned values. The city/down button 52 serves to select a desired city from the city names stored in a memory within the processor for a currently selected time zone. For example, since Seoul and Tokyo are positioned at the same time zone, if a city name, Seoul is being outputted, the button 52 allow the world-wide time display 40 to output the next city name, Tokyo whenever it is pushed once. In a state of selecting year, month, day, week, hour, minute, etc. using the city/down bottom 52, the button 52 acts as a down button to decrease the above-mentioned values. The set buttons 54 are used to control year, month, day, week and time being currently outputted. Whenever it is pushed once, an output of the world-wide time display 44 is selected in accordance with a sequence of year, month, day, week, hour, minute. As a result, a user can control year, month, day, week, hour and minute using the reset/up button 50 and the city/down button 52.

In operation, when a user positions the time zone indicating bar at a desired territory of the earth by rotating the spherical body 12 of the terrestrial globe 20 with a view to knowing a position and a current time and date (e.g., year, month, day, week, etc.) in the desired territory of the earth, the sensor 42 accurately recognizes a rotation amount of the globe and transfers the same to the processor within the world-wide display 44. Subsequently, the processor calculates a major city (or country) name and a current time and date (e.g., year, month, day, week, etc.) in the corresponding time zone on a basis of the transferred input information, thereby displaying the same on the display device.

As described above, in the terrestrial globe with a world-wide watch function according to the present invention, a digital world-wide watch is combined with the convention terrestrial globe, so that a user can easily select the time zone of the earth only with an operation rotating the globe (or the spherical body) and, at the same time, can conveniently see a city (or country) name and a current time and date (i.e., year, month, day, day of the week, Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A terrestrial globe with a world-wide watch function, comprising:

a spherical body having a world map depicted on its surface, the spherical body being divided into a plurality of time zones on the earth;

a rotation axis passing through the center of the spherical body;

a supporting member for supporting the spherical body and the rotation axis;

sensing means, installed at one end of the rotation axis, for detecting a rotation amount of the globe, the sensing means recognizing the rotation amount of the globe by the number of time zones passed during the rotation of the globe, and outputting the recognized rotation amount;

world-wide time displaying means for processing the recognized rotation amount from the sensing means using a processor included in itself to display a major city name and a current time in a time zone corresponding to the rotation amount of the globe, the processor storing data for major city names and time difference in each time zone;

time zone indicating means arranged in parallel to the axis in such a manner to keep the same position independently of a rotation of the spherical body, for pointing out the corresponding time zone; and a major city name selecting means for selectively displaying one of major city names within each time zone.

2. The terrestrial globe as claimed in claim 1, wherein the world-wide displaying means includes a display device for displaying a major city name and a current time in the corresponding time zone.

3. The terrestrial globe as claimed in claim 1, wherein the display device consists of a liquid crystal display.

4. A terrestrial globe with a world-wide watch function, comprising:

a spherical body having a world map depicted on its surface, the spherical body being divided into a plurality of time zones on the earth;

a rotation axis passing through the center of the spherical body;

a supporting member for supporting the spherical body and the rotation axis;

sensing means, installed at one end of the rotation axis, for detecting a rotation amount of the globe, the sensing means recognizing the rotation amount of the globe by the number of time zones passed during the rotation of the globe, and outputting the recognized rotation amount;

world-wide time displaying means for processing the recognized rotation amount from the sensing means using a processor included in itself to display a major city name and a current time and date (i.e., year, month, day, and day of the week) in a time zone corresponding to the rotation amount of the globe, the processor storing data for major city names and time difference in each time zone and calculating the current time from the time differences based on the recognized rotation amount and the time displayed previously;

time zone indicating means arranged in parallel to the axis in such a manner to keep the same position independently of a rotation of the spherical body, for pointing out the corresponding time zone; and a major city name selecting means for selectively displaying one of major city names within each time zone.

5. The terrestrial globe as claimed in claim 4, wherein the world-wide displaying means includes a display device for displaying a major city name and a current time and date (i.e., year, month, day, and day of the week) in the corresponding time zone.

6. The terrestrial globe as claimed in claim 5, wherein the display device consists of a liquid crystal display.

* * * * *